(12) United States Patent
Yamada

(10) Patent No.: US 6,398,007 B1
(45) Date of Patent: Jun. 4, 2002

(54) ALIGNING AND FEEDING DEVICE FOR A PARTS FEEDER

(75) Inventor: Makoto Yamada, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/432,801

(22) Filed: Nov. 3, 1999

(30) Foreign Application Priority Data

Nov. 4, 1998 (JP) ............................................. 10-312895

(51) Int. Cl.$^7$ ............................................. B65G 47/24
(52) U.S. Cl. .......................... 198/399; 380/395; 406/87
(58) Field of Search .................... 700/213; 198/380, 198/395, 399; 406/73, 87

(56) References Cited

U.S. PATENT DOCUMENTS

| | | | |
|---|---|---|---|
| 3,419,129 A | | 12/1968 | Knoth |
| 3,563,361 A | * | 2/1971 | Oiroutek ..................... 198/33 |
| 3,752,311 A | * | 8/1973 | Kobusch et al. .............. 209/72 |
| 4,261,680 A | * | 4/1981 | Carnley et al. ............. 414/421 |
| 4,513,852 A | * | 4/1985 | Fegley et al. ............... 198/399 |
| 4,801,043 A | * | 1/1989 | Cindric ....................... 198/395 |
| 4,847,487 A | | 7/1989 | Bordini |
| 4,960,360 A | * | 10/1990 | Giannuzzi et al. .......... 414/755 |
| 5,009,305 A | * | 4/1991 | Auld et al. ................. 198/395 |
| 5,117,963 A | | 6/1992 | Thayer et al. |

FOREIGN PATENT DOCUMENTS

| | | |
|---|---|---|
| CH | 505666 | 4/1969 |
| CH | 505666 | 4/1971 |
| DE | 3026647 | 4/1981 |
| JP | 9-251885 | 9/1997 |

OTHER PUBLICATIONS

English language abstract of JP 9–251885.

* cited by examiner

Primary Examiner—Christopher P. Ellis
Assistant Examiner—Khoi H. Tran
(74) Attorney, Agent, or Firm—Greenblum & Bernstein, P.L.C.

(57) ABSTRACT

An orientation identification device is provided in a transporting route for a parts feeder which transports parts in a desired orientation. The orientation identifying device can identify the orientation of the parts, and according to the orientation thus identified, an inverting mechanism corrects the orientation of parts. Due to the clear identification of the orientation of parts, sorting of the parts can be achieved without failure by the inverting mechanism. Even when the orientation of parts is not normal, reduction in a yield rate can be controlled because of the feed to a downstream side by inverting them.

9 Claims, 9 Drawing Sheets

Fig. 8(A) (PRIOR ART)
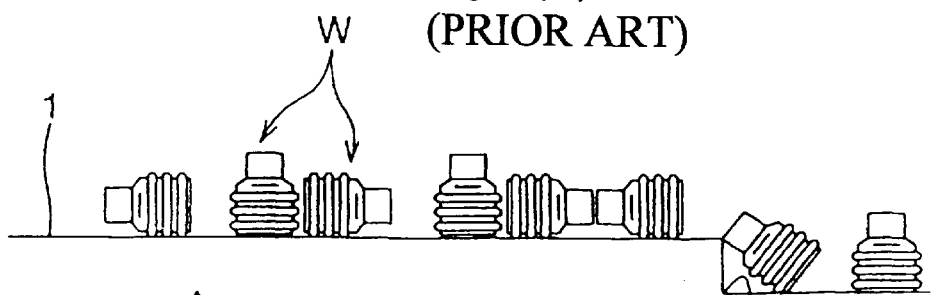
Fig. 8(B) (PRIOR ART)
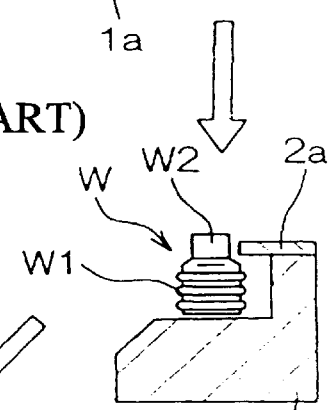
Fig. 8(C) (PRIOR ART)
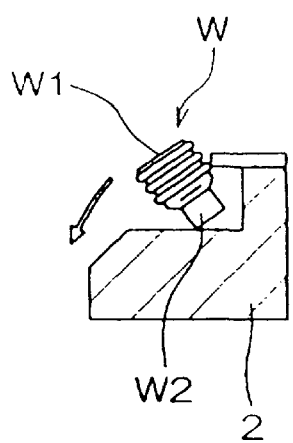
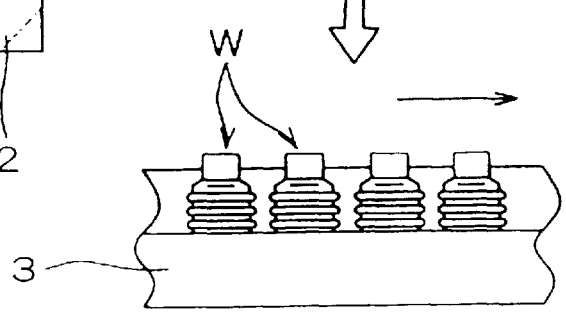
Fig. 8(D) (PRIOR ART)

Fig. 9(A)
(PRIOR ART)
Fig. 9(B)
(PRIOR ART)
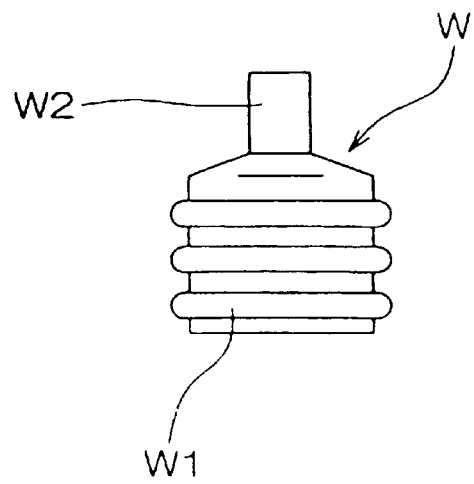
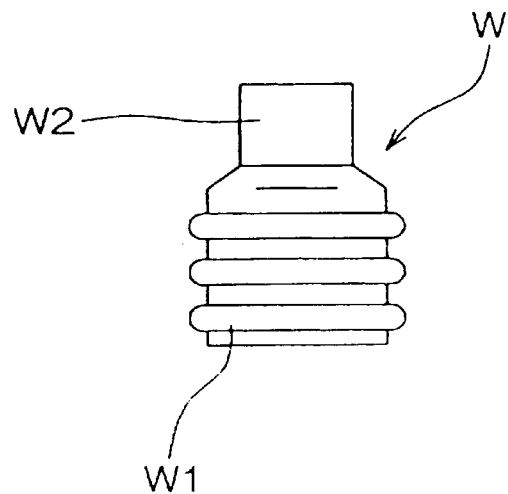
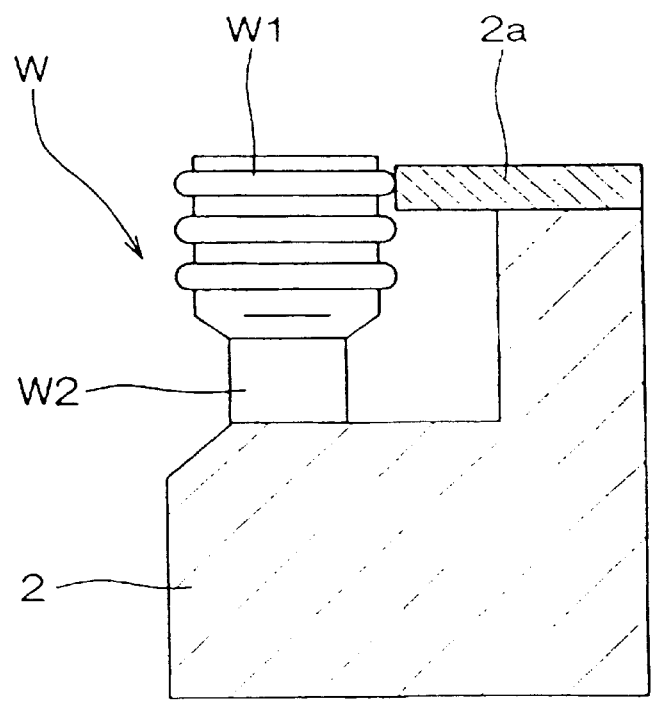
Fig. 10
(PRIOR ART)

ALIGNING AND FEEDING DEVICE FOR A PARTS FEEDER

BACKGROUND OF THE INVENTION

1. Field of the Invention

The present invention relates to an aligning and feeder device for a parts feeder, and particularly relates to an improvement for transporting small pieces, such as rubber plugs, to a processing device in a desired orientation.

2. Description of Background Information

An alignment and feeding device is known in the prior art as depicted in FIGS. 8–10. FIG. 8(A–D) of the accompanying drawings illustrates diagrammatically the steps through which a rubber plug is moved by a mechanism normally provided as a parts feeder. FIG. 9 is a front view of a part W to be fed to the parts feeder. FIG. 10 represents a schematic sectional drawing showing a major area of the conventional parts feeder.

As illustrated in FIGS. 9(A) and 9(B) in one example, the part W comprises a rubber plug. The rubber plug is a cylindrical body of stepped outline comprising a first portion W1 of larger diameter and a second continuous and concentric portion W2 of smaller diameter(although the portion W2 of the plug depicted in FIG. 9(A) is smaller than the portion W2 of the plug depicted in FIG. 9(B). The plugs are so positioned and arranged that in a given orientation the first and second portions are both aligned in a corresponding orientation at the processing device.

FIG. 10 shows a schematic sectional drawing showing a major area of the conventional parts feeder.

As shown in FIG. 8, the parts feeder has a collecting area 1 which collects parts from a storage area for storing the parts W, a sorting area 2 for adjusting the orientation of the collected parts W, and a transporting area 3 for transporting the aligned parts W from an upstream side in an order such as described above. The parts W are then transported to a downstream side by giving, to a sorting area 2 and a transporting area, vibrations generated at an oscillating area which is not illustrated.

As shown in FIG. 8(A), in the collecting area, the parts are fed to a lower stream side by providing a difference in level 1a, thereby causing an axis of part W which represents a column to follow a vertical line. At this stage, some of the parts W1 are disposed in orientations with the larger diameter portion W1 upward(ie. the smaller diameter portion W2 being downward) while some are contrary to the former.

As shown in FIG. 8(B) a drop board 2a which regulates the orientation along the periphery of the part W is provided in the sorting area. Thus when a part with its larger diameter portion W1 upward is transported as shown in FIG. 8(C), the larger diameter portion W1 of the part W makes contact with the drop board 2a. The part W1 will then deviate from a normal transport direction followed by collection into a collecting area 1. As shown in FIG. 8(D), only the parts W sorted out at the sorting area 2 are transported to the lower stream side.

First of all, with reference to FIG. 9(B), there are sometimes parts of which the larger diameter portion W1 and the smaller diameter portion W2 are comparatively closer in dimension, and therefore similar in shape, depending on the particular part W. Even when sorting parts of such a shape by use of the above mentioned drop board 2a, some parts may remain on the sorting area 2 despite their orientation being contrary to the normal as shown in FIG. 10. This demonstrates a deficiency such that the parts W flowed as if they were located on the downstream side.

Furthermore, with the structure or method mentioned above, sorting was merely carried out for the parts of which the orientation was normal as shown in FIG. 8, giving rise to a problem of reducing the yield rate by a quantity of parts W disposed at an opposite orientation. The present invention was made in the light of the above mentioned problems, with an aim to provide an aligning and feeding device capable of efficiently transporting parts reliably at a normal orientation.

According to our invention, an aligning and feeding device includes an orientation identification device that identifies the orientation of parts installed in a transport route for a parts feeder which transport parts have a given orientation, an inverting device that inverts the parts, and a control device that controls the motion of the inverting device based on the orientation of the identified parts.

With the invention containing this specific item and because of the identification of the orientation of parts by the orientation identifying device in carrying out the inversion of parts, an inverting function of the inverting device is made possible without fault. In addition, even when the orientation of the parts is not normal, parts are fed to a downstream side by inversion without returning them to an upstream side. This makes it possible to suppress the reduction in a yield rate.

The present invention has been created to obviate the problems described above, and the purpose is to provide a reliable orientation identification device and a transporting route for a parts feeder to transport parts in a desired orientation.

SUMMARY OF THE INVENTION

An orientation identification device is provided in a transporting route for a parts feeder which transports parts in a desired orientation. The orientation identifying device can identify the orientation of parts, According to the orientation thus identified, an inverting device corrects the orientation of parts.

In one preferred embodiment, an orientation identifying device identifies the orientation of those parts installed in a transport route for a parts feeder having a given orientation, an inverting device that inverts the parts and a controller that controls the motion of the inverting device based on the identified orientation of the parts.

According to another aspect of the present invention, the inverting device includes an inverting transport route that changes the orientation of a part, a non-inverting transport route that feeds normal parts to a downstream side bypassing the inverting route, and a dividing member that divides the parts fed from the parts feeder into an appropriate one of the routes based on identification of the identifying means.

In another aspect of the present invention, a dividing space is traversed by a reciprocally mounted dividing member, a pair of communicating holes are interconnected by a tube, and a pressurizing air supply hole and a transport exhaust hole each face a respective communication hole. The air supply hole and the exhaust hole are blocked by the dividing member in a home position in which a part is in a given position and follows the non-inverting route, end the dividing member is movable into a second position to unblock the holes by aligning them with the complementary holes in the dividing member to define a route for an inverted part.

According to a further aspect of the present invention, the dividing member includes a slide holder equipped with a recessed area to receive parts from transport area, an insertion hole formed in the recessed area defining a transport slit, and a photoelectric sensor that judges the quantity of light transmitted through the slit to indicate the orientation of a part.

According to another aspect of the present invention, the control device that reciprocates the dividing member is operated in response to a detected signal from the sensor to move the dividing member between the home position and the second position.

In another aspect of the present invention, the control device uses a CPU for receiving a detected signal, and a cylinder for moving the dividing member in response to a signal from the CPU.

According to another aspect of the present invention, the CPU uses a micro computer and a measuring area that measures a transmitted light quantity from a signal that is entered via the sensor and an orientation judging area which judges the orientation of the parts.

With the present invention, the parts can be inverted efficiently with the use of less material due to the change in the orientation of parts by using the switching transport routes.

Other exemplary embodiments and advantages of the present invention may be ascertained by reviewing the present disclosure and the accompanying drawings.

BRIEF DESCRIPTION OF THE DRAWING

The present invention is further described in the detailed description which follows, in reference to the noted plurality of drawings by way of non-limiting examples of certain embodiments of the present invention, in which like numerals represent like elements throughout the several views of the drawings, and wherein:

FIG. 8 depicts a layout showing transport procedures which diagrammatically illustrates a mechanism provided in a conventional parts feeder;

FIGS. 9(A) and(B) are schematic cross sectional views showing a part to be fed by the conventional parts feeder; and FIG. 10 is a schematic cross section showing an essential part of the conventional parts feeder.

DETAILED DESCRIPTION OF THE PREFERRED EMBODIMENTS

As illustrated in FIGS. 1–7 of the accompanying drawings, an orientation identification device 16 is provided in a transport route of a parts feeder 20 which transports parts W in a desired orientation. The orientation identifying device 16 can identify the orientation of parts W. According to the orientation thus identified, an inverting mechanism 13 and 14 corrects the orientation of the parts W. Due to the clear identification of the orientation of parts W, sorting the orientation of the parts W can be achieved without fail by an inverting mechanism. Even when the orientation of the parts W is not normal, reduction in a yield rate can be controlled because of the feed to a downstream side by inverting them.

Figure 2:
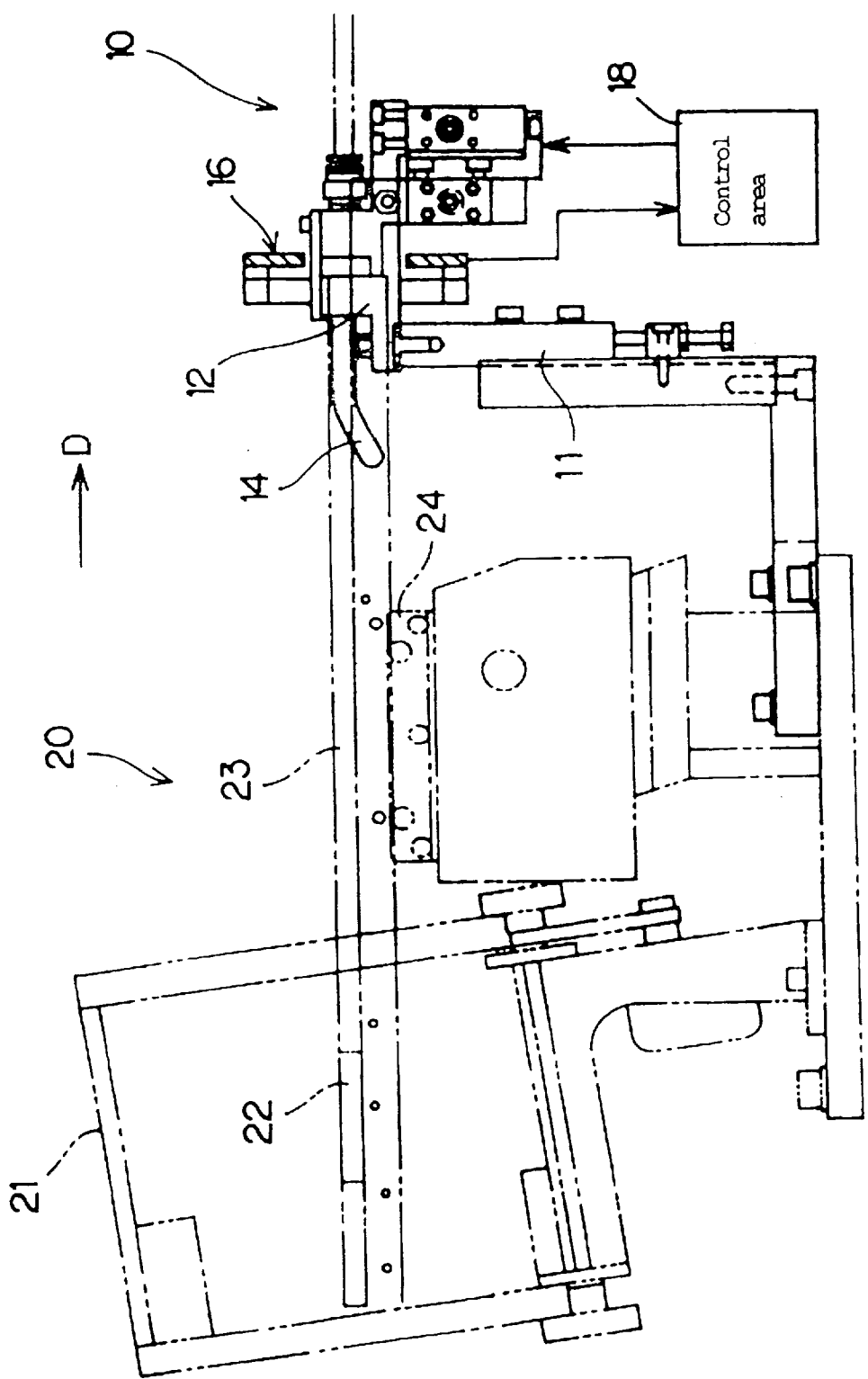
FIG. 2 is a front elevation view showing an outline of a parts feeder utilizing the aligning and feeding device in FIG. 1.

With reference to FIG. 2, an illustrated parts feeder 20 is equipped with a drum-form storage area 21, a collecting area 22 for collecting parts from the storage area 21, a chute-form transporting area 23 for feeding the collected parts W, and an oscillating area 24 which supports the transporting area 23 in an oscillating manner. An aligning and feeding device 10 of the present invention is provided on the parts feeder 20 through a mounting member 11 at the downstream end at the above mentioned transporting area 23.

The illustrated parts feeder 20 is to a certain extent simplified compared with the preceding example, namely by feeding a generally columnar shape part(rubber plug) W having a given orientation to a downstream side in such a manner that the axis exclusively follows along the transport direction D. The parts W transported on the above mentioned transporting area 23 are at different orientations, namely at a normal given orientation to be fed to a processing device(not illustrated) and an orientation inverted by 180° to the normal orientation.

These parts W at different orientations are fed to the aligning and feeding device 10. In this embodiment, respective parts are disposed at orientations of which their axes are relatively slanted to a transport direction with the parts having a larger diameter portion W1 at the downstream side mixed with those at the upstream side.

Figure 1:
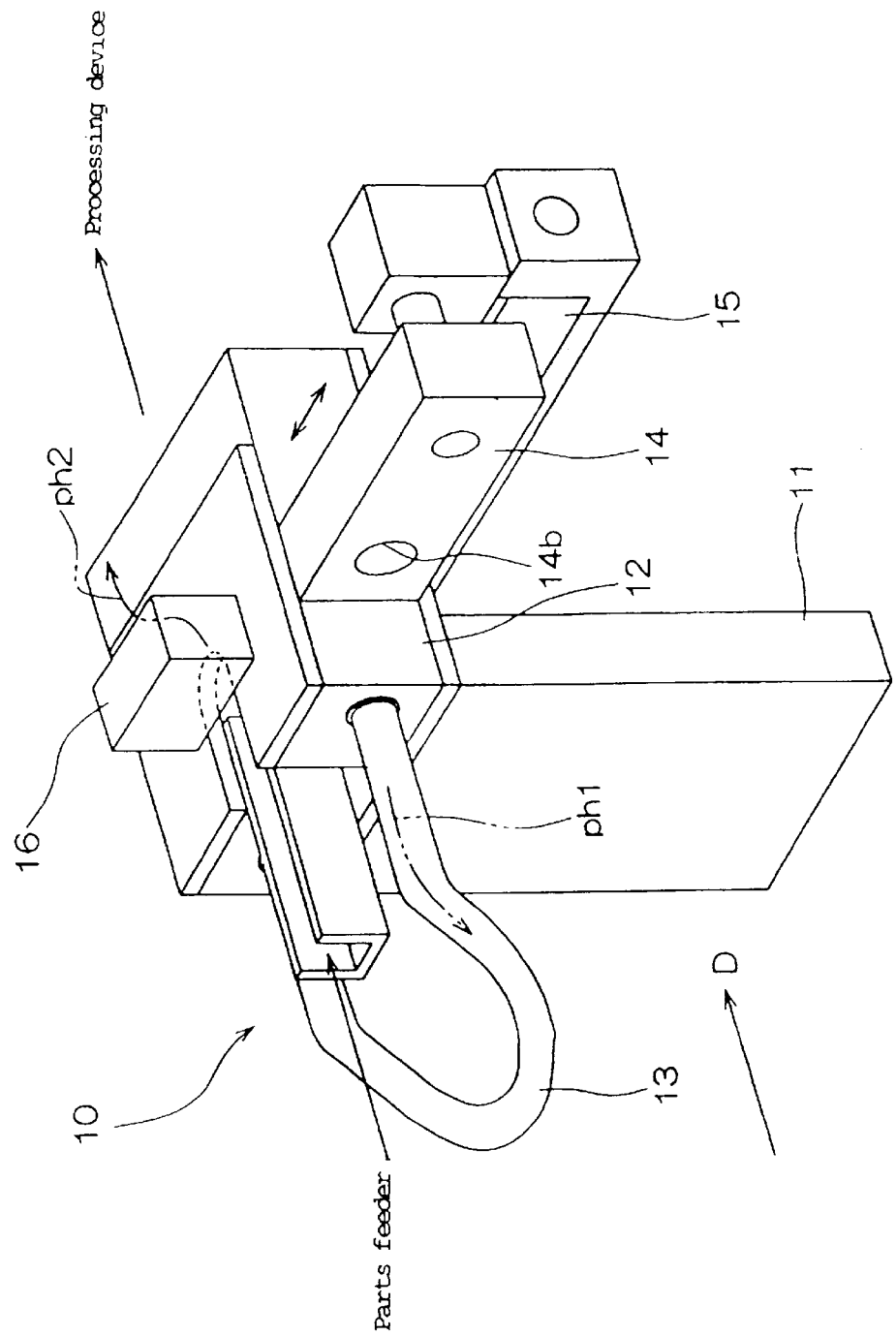
FIG. 1 is a perspective view showing an aligning and feeding device according to the present invention.

With reference to FIGS. 1, 3 and 4, the aligning and feeding device 10 retains a near-block shape body 12 supported on the upper end of the above mentioned mounting member 11. The main body 12 has an internal section in which a dividing space S is communicably conducted with the downstream end of the transporting area 23 on the above mentioned parts feeder 20.

In this dividing space S, a pair of communicably conducting holes 12a and 12b penetrate horizontally through the transport direction D at the upstream side in a transport direction D of parts feeder 20, and are interconnected through a tube 13.

Figures 3A, 3B:
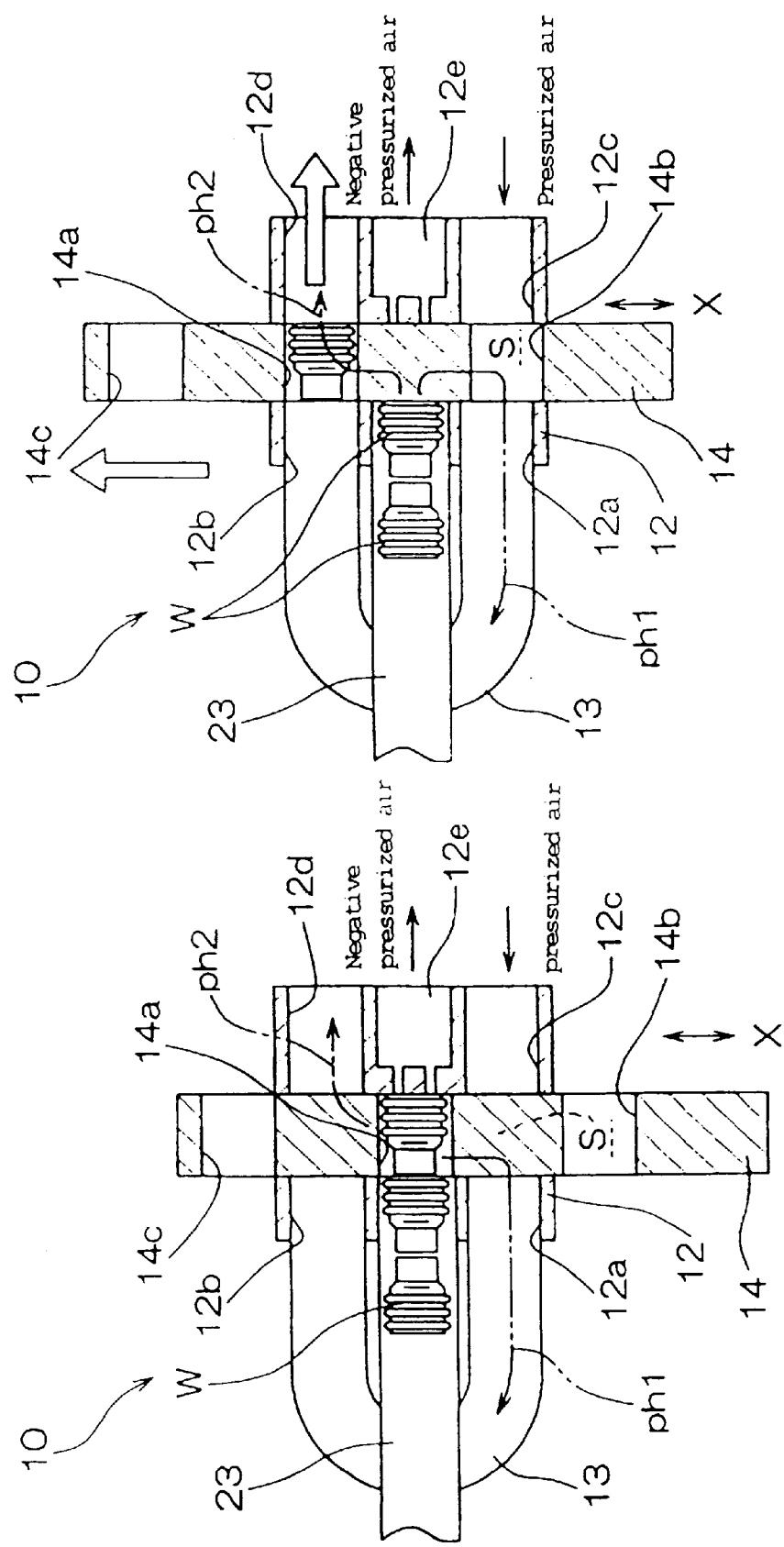
FIGS. 3(A) and 3(B) are partial transverse cross sections of the aligning and feeding device of FIG. 1.
Figures 4A, 4B:
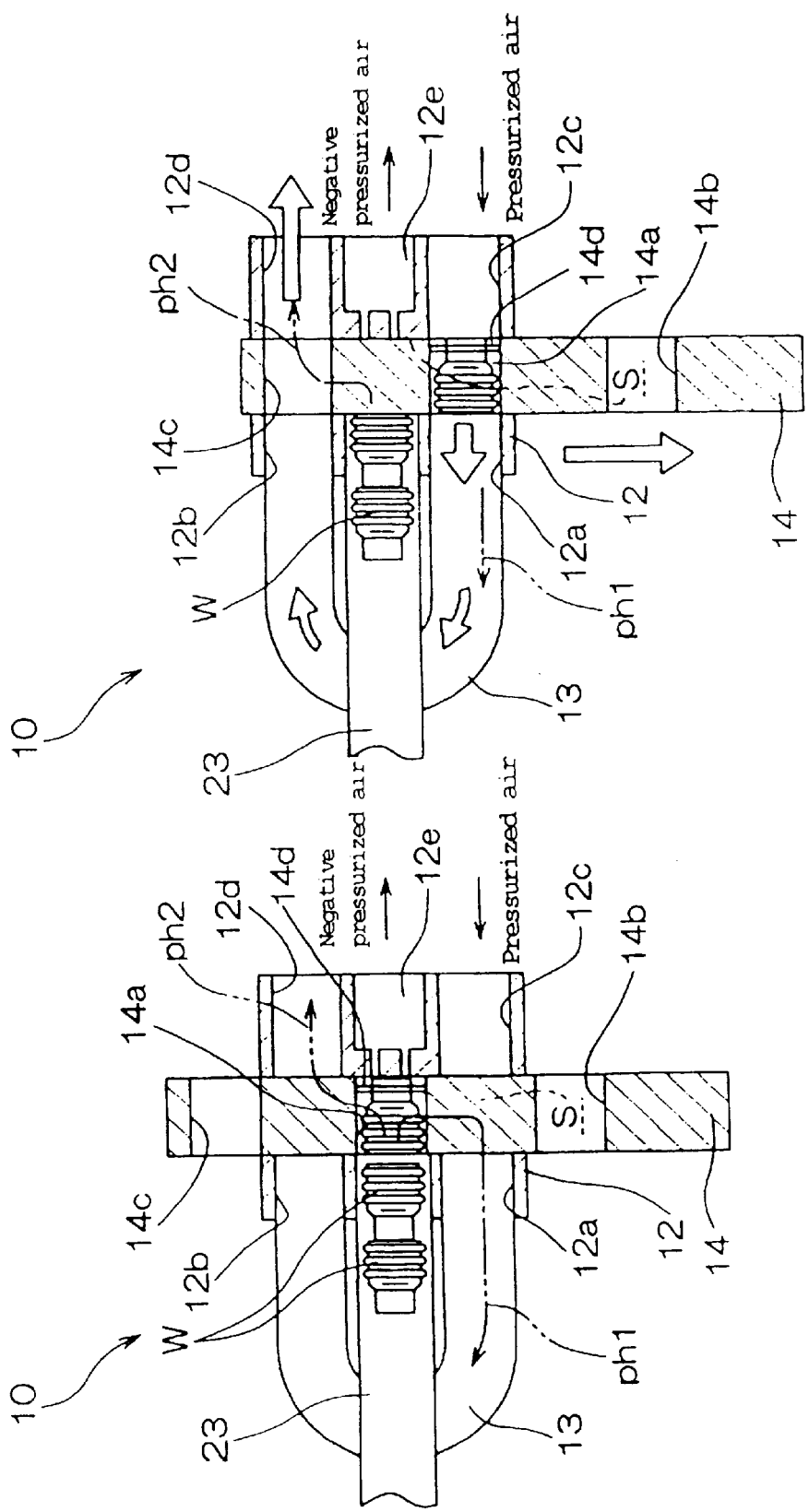
FIGS. 4(A) and 4(B) are partial transverse cross sections of the aligning and feeding device of FIG. 1.

A pressurizing air supply hole 12c and a transport hole 12d are provided in the main part 12. The holes 12c and 12d horizontally face respective communicating holes 12a and 12b along the downstream transport direction D of the parts feeder 20. The pressurized air supply hole 12c and the transport exhaust hole 12d are blocked by a slide holder 14 which will be described later, under the condition shown in FIG. 3(A) and FIG. 4(A), and is designed to be released at the same time at a certain timing as shown in FIG. 3(B) and FIG. 4(B). The pressurized air supply hole 12c is connected with a pressurized air supply source(not shown), and is provided for transporting the parts W from a transporting hole 12d. The transporting hole 12d can be connected with another communicating hole by supplying the pressurized air to the above mentioned one communicating hole 12a when both holes 12c and 12d are released by the slide holder 14.

The slide holder 14 is reciprocally movable along a horizontal direction X which intersects a parts transporting direction of the parts feeder 20 in the above mentioned dividing space S. Furthermore, in order to reciprocally transport the slide holder 14, a cylinder 15 is mounted on the lower surface of the main body 12.

The slide holder 14 is, at the home position as shown in FIG. 3(A) and FIG. 4(A), equipped with a recessed area 14a to which parts W are communicably conducted in a receivable manner from the transporting area 23. Communicably connecting holes 14b and 14c are formed on both sides of the recessed area 14a, and the recessed area 14a and the communicably conducted holes 14b and 14c are so designed with enough space that only one correctly standing or inverted part W can be accommodated therein.

The slide holder 14 is so designed that at the above mentioned home position, the slide holder will close the respective communicable conducting holes 12a and 12b (consequently, pressurized air hole 12c and transport hole 12d) provided on the main body 12, and any compatible one among respective communicable conducting holes 14b and 14c will release the communicable conducting hole 12b (or 12a) of the main body 12 when the above mentioned recessed area 14 is connected with either of the communicable conducting holes 12a (12b). Consequently, when the recessed area 14a is connected with the communicable conducting hole 12a, parts W are carried out through a tube 13 from the transporting hole 12d by pressurized air in a condition in which the orientation is inverted 180°.

On the other hand, when the recessed area 14a is connected with the other communicable conducting hole 12b, parts W are carried out in the same orientation by bypassing the tube 13.

In such a way, in the illustration as shown, a tube 13 constitutes an orientation inverting route ph1 while the transporting hole 12d constitutes a non-inverting route ph2. In this case, in the illustrated embodiment, a negative pressurized air hole 12e connected with a recessed area 14a in the home position is formed, and, by applying a negative pressure from this negative pressurized air hole 12e, parts W in a transporting area 23 are introduced into the recessed area 14a, one by one.

Figure 5A:
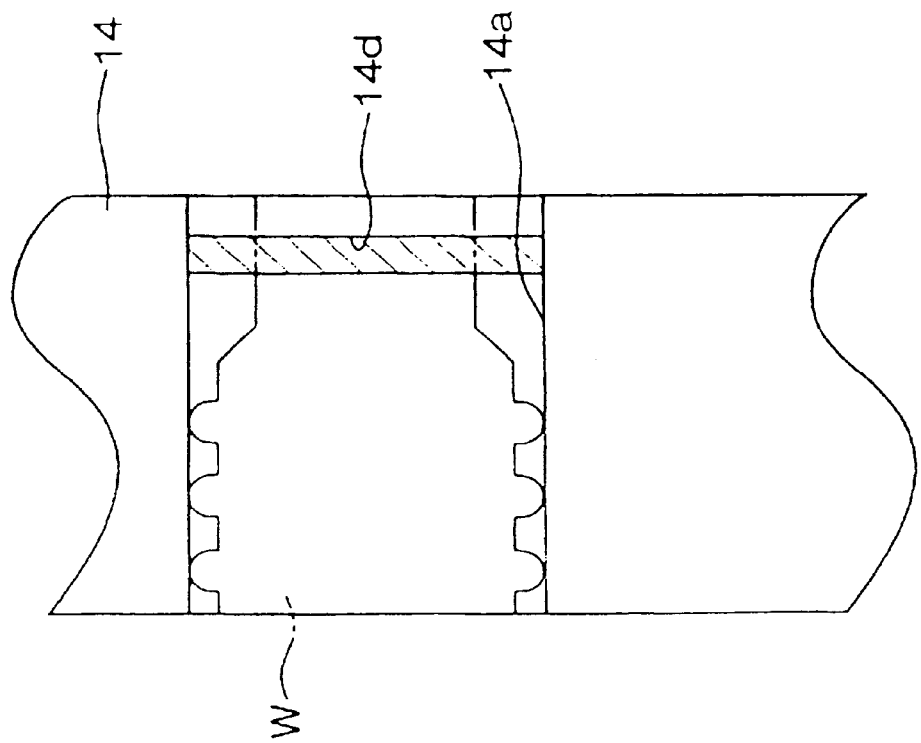
FIGS. 5(A) and 5(B) are partial schematic plan views showing an enlarged essential part of a slide holder of the parts feeder.

FIGS. 5(A) and(B) are partial plan views showing an enlarged essential area of a slide holder 14.

Figure 5B:
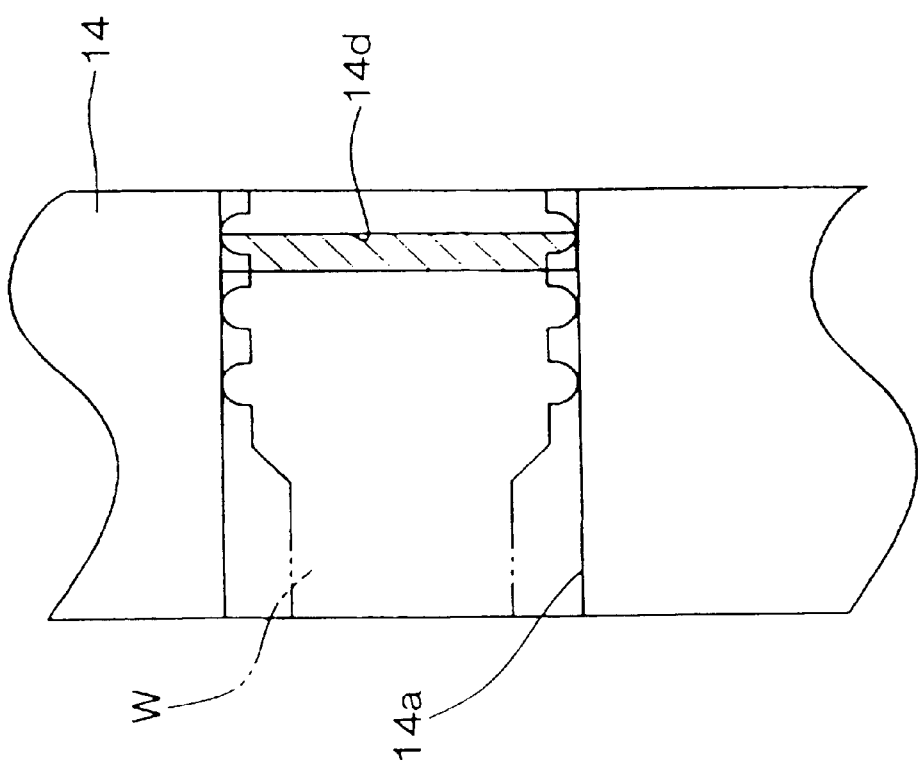

Referring to FIG. 1 and FIG. 5, at the bottom of the recessed area 14a, a rectangular insertion hole 14d defining a transport slit is formed. A photoelectric sensor 16 is also mounted on the main body. The photoelectric sensor 16 is designed in such a manner that light projected from the upper side onto a transparent slit 14d is then received on the lower side, and the orientation of the part W can be determined according to the quantity of the light transmitted therethrough.

Figure 6:
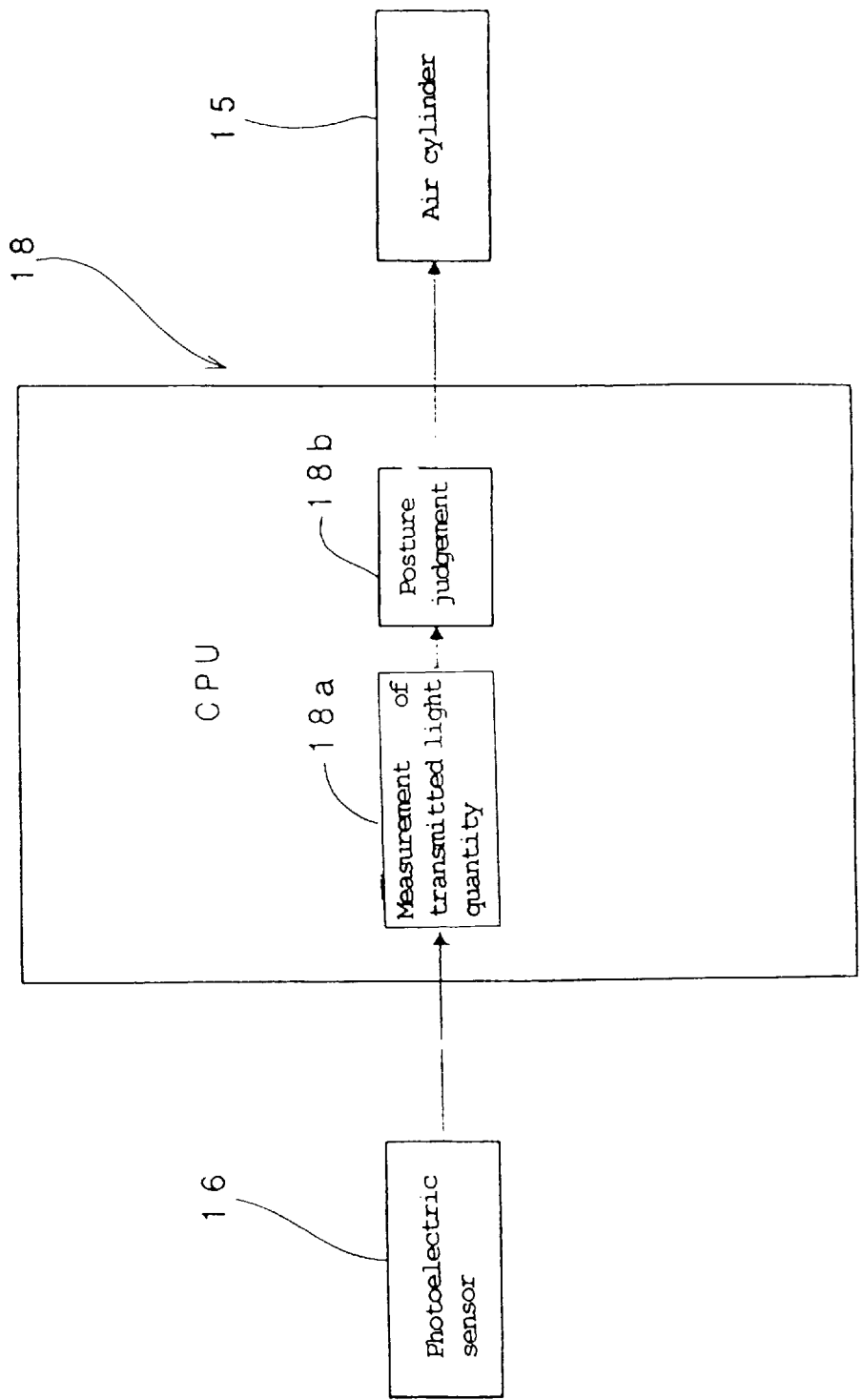
FIG. 6 is a block diagram showing a control unit of the aligning and feeding device of FIG. 1.

FIG. 6 is a block diagram showing a control unit of an aligning and feeding device 10. In reference to the drawing, on the aligning and feeding device, a CPU 18 is provided for receiving a detected signal from the photoelectric sensor 16, and on the CPU 18, the cylinder 15 which drives the above mentioned slide holder 14 is connected in a controllable manner. The CPU 18 may be a micro computer having ROMs, RAMs, etc., and includes a measuring area 18a which measures a transmitted light quantity from a signal entered via the photo sensor 16 using the program, and an orientation determining area 18b which determines the orientation of the parts W. According to the results obtained in the orientation determining area 18b, the CPU 18 controls an air cylinder 15 in the following manner.

Figure 7:
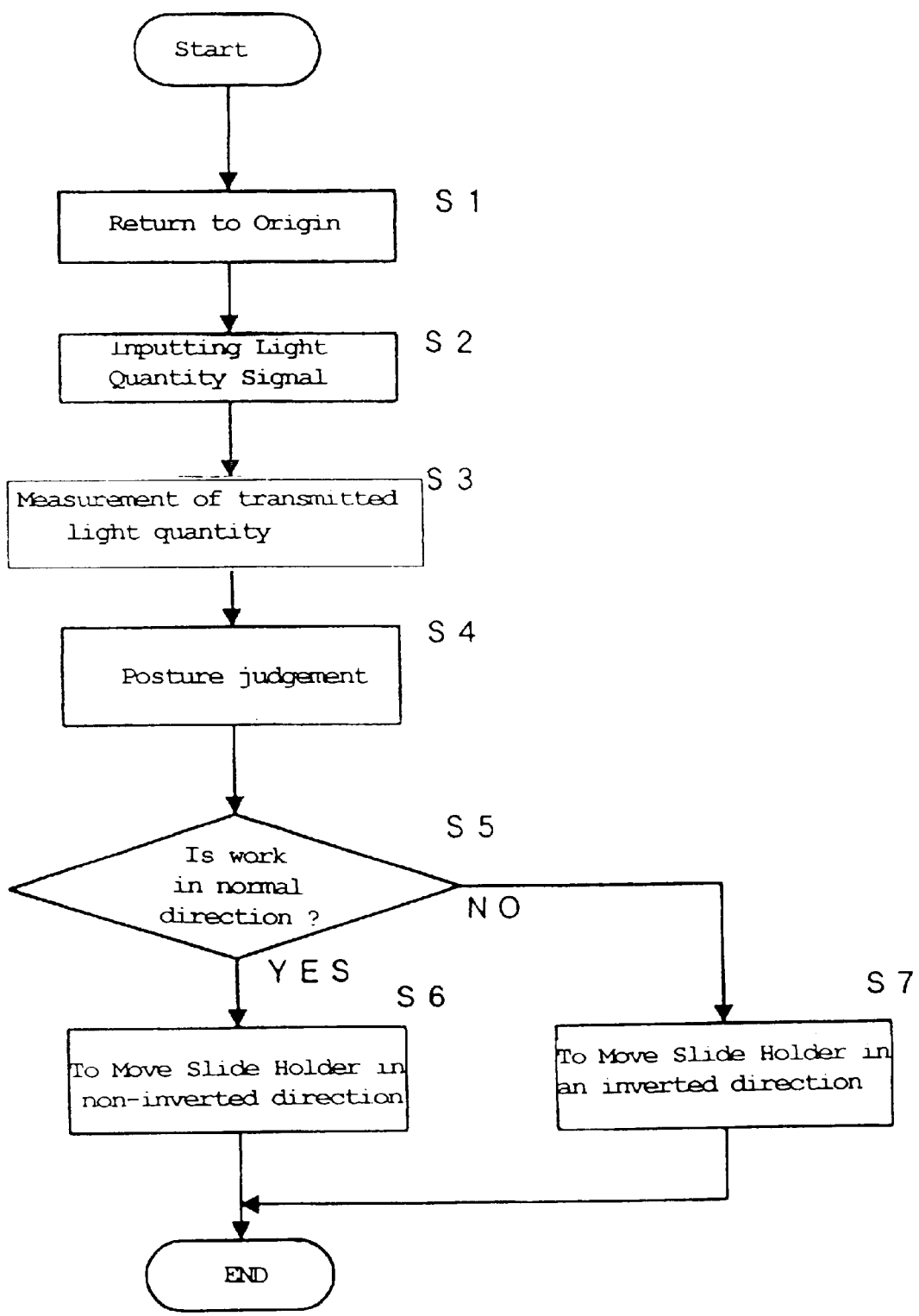
FIG. 7 is a flow chart showing the motion of the aligning and feeding device of FIG. 1.

FIG. 7 represents a flow chart showing a motion of an aligning and feeding device 10 in FIG. 1.

First of all, in the step S1, a power source is energized which is followed by the start of the aligning and feeding device 10, the photoelectric sensor 16 enables the orientation of parts W to be identified, the CPU 18 drives the air cylinder 15, thereby moving the slide holder 14 to the home position as shown in FIG. 3(A) or FIG. 4(A). In this condition, the parts feeder 20 is driven, and parts W are gradually transported from a transporting area 23 into the main body 12.

In this case, as shown in FIG. 3(A), when a part W is transported in a normal orientation, the CPU 18 receives an input light quantity signal at S2 and based on the determined results at step S3, and S4(note FIG. 7) drives a slide holder 14 as shown in FIG. 3(B), and transports the parts W which were transferred to the recessed area 14a to a non-inverting route ph2 (steps 5 and S6). In this way, the pressurized air supplied from a pressurized air supply hole 12c pressurizes the parts W from a tube 13, and as a result of supply to a processing device(not shown) at a downstream side, the parts W which were transported in a normal orientation are directly supplied by bypassing the orientation inverting route ph1.

On the other hand, when the parts W are in an inverted position, as shown in FIGS. 4(A) and (B), the CPU 18 drives the slide holder 14 in an inverted direction to the above, thereby transporting the parts W which are transferred to the recessed area 14a to an orientation inverting route ph1 (step S5 and S7).

In this way, pressurized air supplied from the pressurized air supply hole 12c introduces the parts W into a tube 13 by driving them, and, by having them pass through the tube 13, and the parts W are fed to a processing device(not shown) at a downstream side in an inverted state.

As described above, in the above mentioned embodiment, as the posture of parts W having a smaller dimensional difference between a larger diameter area W1 and a smaller diameter area W2 as shown in FIG. 9(B) can be inverted and transported without fail, and, in addition, reduction in a yield rate can be controlled. This makes it possible to achieve the remarkable result of efficient transport in a duly normal orientation.

Particularly, there is an advantage that changes in orientation of the parts W by switching the orientation inverting routes ph1 and ph2 enable efficient inversion of the parts W.

The embodiment described above is only one preferable embodiment of the present invention. The present invention is not limited to the above mentioned embodiment alone as illustrated by the description and figures of the drawings described above. That is, it is possible to make a wide variety of changes in design within the scope of the claims of the present invention.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. JP 10-312895, filed on Nov. 4, 1998, which is expressly incorporated by reference in its entirety.

What is claimed is:

1. An aligning and feeding device comprising:
   an orientation identifying device that identifies an orientation of parts installed in a transport route for a parts feeder which transports the parts having a given orientation;
   an inverting mechanism that inverts parts; and
   a controller that controls the motion of the inverting mechanism based on the identified orientation of the parts;
   wherein said inverting mechanism comprises:
      an inverting route that changes the orientation of the part;
      a non-inverting route that feeds the parts to a downstream side by by-passing the inverting route;
      a dividing member that divides the parts which are fed from the parts feeder in such a manner that the fed parts are alternatively divided into one of said inverting route and said non-inverting route based on the identified orientation of the parts by said identifying device; and
      a body, wherein said body comprises:
         at least one dividing space traversed by said dividing member, said dividing member being reciprocally mounted;
         a pair of communicating holes, interconnected by a tube;
         a pressurizing air supply hole, and a transport exhaust hole, each facing a respective one of said respective communicating holes, said air supply hole and said exhaust hole being blocked by said dividing member in a first position in which the part is in a given orientation and follows said non-inverting route; and
         said dividing member being movable into a second position to unblock said air supply and exhaust holes by aligning them with complementary holes in said dividing member to define said inverting route for said inverted part.

2. An aligning and feeding device according to claim 1, wherein said dividing member comprises:
   a slide holder provided with a recessed area to which the parts are conducted in a receivable manner from all upstream transport area;
   an insertion hole formed in the recessed area defining a transport slit; and
   a photoelectric sensor arranged to determine the quantity of light transmitted through said slit to indicate the orientation of a part.

3. An aligning and feeding device according to claim 2, wherein said controller is operated in response to a detected signal from said sensor to move said dividing member between the first position and the second position.

4. An aligning and feeding device according to claim 3, wherein said controller comprises a CPU for receiving the detected signal, and a cylinder is provided that moves said dividing member in response to a signal from said CPU.

5. An aligning and feeding device according to claim 4, wherein said CPU comprises:
   a micro computer;
   a measuring area which measures a transmitted light quantity from a signal entered via said sensor; and
   an orientation determining area which determines the orientation of the parts.

6. An aligning and feeding device comprising:
   an orientation identifying device that identifies an orientation of parts installed in a transport route for a parts feeder which transports the parts having a given orientation;
   an inverting mechanism that inverts parts; and
   a controller that controls the motion of the inverting mechanism based on the identified orientation of the parts;
   wherein said inverting mechanism comprises:
      an inverting route that changes the orientation of the part;
      a non-inverting route that feeds the parts to a downstream side by by-passing the inverting route; and
      a dividing member that divides the parts which are fed from the parts feeder in such a manner that the fed parts are alternatively divided into one of said inverting route and said non-inverting route based on the identified orientation of the parts by said identifying device;
   wherein said dividing member comprises:
      a slide holder provided with a recessed area to which the parts are conducted in a receivable manner from an upstream transport area;
      an insertion hole formed in the recessed area defining a transport slit; and
      a photoelectric sensor arranged to determine the quantity of light transmitted through said slit to indicate the orientation of a part.

7. An aligning and feeding device according to claim 6, wherein said controller is operated in response to a detected signal from said sensor to move said dividing member between a first position corresponding to said non-inverting route and a second position corresponding to said inverting route.

8. An aligning and feeding device according to claim 7, wherein said controller comprises a CPU for receiving the detected signal, and a cylinder is provided that moves said dividing member in response to a signal from said CPU.

9. An aligning and feeding device according to claim 8, wherein said CPU comprises:
   a micro computer;
   a measuring area which measures a transmitted light quantity from a signal entered via said sensor; and
   an orientation determining area which determines the orientation of the parts.

* * * * *

UNITED STATES PATENT AND TRADEMARK OFFICE
CERTIFICATE OF CORRECTION

PATENT NO.    : 6,398,007 B1
DATED         : June 4, 2002
INVENTOR(S)   : M. Yamada It is certified that error appears in the above-identified patent and that said Letters Patent is hereby corrected as shown below:

<u>Column 7,</u>
Line 49, "all" should be -- an --.

Signed and Sealed this

Eleventh Day of March, 2003

JAMES E. ROGAN
*Director of the United States Patent and Trademark Office*